US009866399B2

(12) United States Patent
Wu et al.

(10) Patent No.: US 9,866,399 B2
(45) Date of Patent: Jan. 9, 2018

(54) BINDING NEARBY DEVICE TO ONLINE CONFERENCE SESSION

(71) Applicant: Cisco Technology, Inc., San Jose, CA (US)

(72) Inventors: Yuan Wu, Jiangsu (CN); Bin Feng, Jiangsu (CN); Qian Wang, Jiangsu (CN); YiQi Hu, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 900 days.

(21) Appl. No.: 14/253,957

(22) Filed: Apr. 16, 2014

(65) Prior Publication Data

US 2015/0304121 A1 Oct. 22, 2015

(51) Int. Cl.
*G06F 15/16* (2006.01)
*H04L 12/18* (2006.01)
*H04L 29/06* (2006.01)

(52) U.S. Cl.
CPC ...... *H04L 12/1822* (2013.01); *H04L 65/1093* (2013.01); *H04L 65/403* (2013.01)

(58) Field of Classification Search
CPC H04L 12/1822; H04L 65/1093; H04L 65/403
See application file for complete search history.

(56) References Cited

U.S. PATENT DOCUMENTS

| 6,687,369 B1 * | 2/2004 | Crespo | H04M 1/723 379/373.02 |
| 7,720,217 B1 * | 5/2010 | Connolly | H04M 1/6041 379/376.01 |
| 8,626,847 B2 | 1/2014 | Jones et al. | |
| 8,743,743 B1 * | 6/2014 | Mai | H04M 3/566 370/260 |
| 8,868,100 B1 * | 10/2014 | Price | H04M 1/6008 379/388.02 |
| 2006/0147009 A1 * | 7/2006 | Greenlee | H04L 29/06027 379/202.01 |
| 2008/0122796 A1 * | 5/2008 | Jobs | G06F 3/0488 345/173 |
| 2009/0088221 A1 * | 4/2009 | Gilbert | H04M 1/72566 455/567 |
| 2009/0153490 A1 * | 6/2009 | Nymark | H04M 1/72519 345/169 |
| 2010/0297981 A1 * | 11/2010 | Ballantyne | H04M 1/72536 455/404.2 |
| 2010/0322387 A1 * | 12/2010 | Cutler | H04M 3/2236 379/32.01 |

(Continued)

FOREIGN PATENT DOCUMENTS

| EP | 1 653 719 A1 | 5/2006 |
| WO | 2008023359 A2 | 2/2008 |

*Primary Examiner* — Richard G Keehn
(74) *Attorney, Agent, or Firm* — Edell, Shapiro & Finnan, LLC

(57) ABSTRACT

A meeting server receives a request to join an online conference session from a first device at a first location. The first device is associated with a user account. The meeting server then determines at least one second location corresponding to at least one second device also associated with the user account. Responsive to a determination that the second location is within a predetermined distance of the first location, the meeting server transmits a command to mute the second device.

24 Claims, 12 Drawing Sheets

(56) References Cited

U.S. PATENT DOCUMENTS

| | | | | |
|---|---|---|---|---|
| 2013/0137376 A1* | 5/2013 | Fitzgerald | ............ | H04B 5/0056 |
| | | | | 455/41.3 |
| 2013/0317635 A1* | 11/2013 | Bates | ..................... | H04R 27/00 |
| | | | | 700/94 |
| 2014/0015952 A1* | 1/2014 | Guo | ........................ | H04M 3/42 |
| | | | | 348/78 |
| 2014/0087704 A1* | 3/2014 | DeCesaris | ............... | H04W 4/12 |
| | | | | 455/416 |
| 2015/0024717 A1* | 1/2015 | Kochhar | ................. | H04W 4/16 |
| | | | | 455/413 |
| 2015/0156598 A1* | 6/2015 | Sun | ..................... | H04L 12/1822 |
| | | | | 348/14.07 |

* cited by examiner

BINDING NEARBY DEVICE TO ONLINE CONFERENCE SESSION

TECHNICAL FIELD

The present disclosure relates to providing privacy and a good user experience in online conference sessions.

BACKGROUND

Online conference session allow participants from around the world to communicate and share ideas. Typically, a user only joins an online conference session with a single device, but with the increasing ubiquity and capability of mobile devices, a user may have multiple devices that may be used to join an online conference session. Each of these mobile devices may also initiate and/or carry on a communication session, such as a phone call, outside of the online conference session. If the user receives a phone call on a mobile phone that is near the device used to communicate with the online conference session, then the ringing of the phone may be broadcast to the entire conference session, interrupting the session. Additionally, if the user forgets to mute his microphone into the conference session, the user's side of the phone conversation may be broadcast to everyone in the conference session. This may lead to unauthorized individuals overhearing potential private and confidential matters.

DESCRIPTION OF EXAMPLE EMBODIMENTS

Overview

In accordance with one aspect, a meeting server receives a request to join an online conference session from a first device at a first location. The first device is associated with a user account. The meeting server then determines at least one second location corresponding to at least one second device also associated with the user account. Responsive to a determination that the second location is within a predetermined distance of the first location, the meeting server transmits a command to mute the second device.

In accordance with another aspect, a first device joins an online conference session using a user account. A first notification is received within the online conference session that a second device associated with the user account has received an incoming communication request outside of the online conference session, wherein the second device is located within a predetermined distance of the first device. The notification is displayed on the first device as part of the online conference session.

In accordance with still another aspect, at a first device associated with a user account, a first command is received from a meeting server to enter a silent mode, the meeting server facilitating an online conference session among a plurality of devices other than the first device. The plurality of devices includes a second device associated with the user account, and wherein the first device is within a predetermined distance of the second device. The first device receives a request for communication outside the online conference session. The first device transmits to the meeting server a notification of the request for communication outside the online conference session.

Example Embodiments

Figure 1:
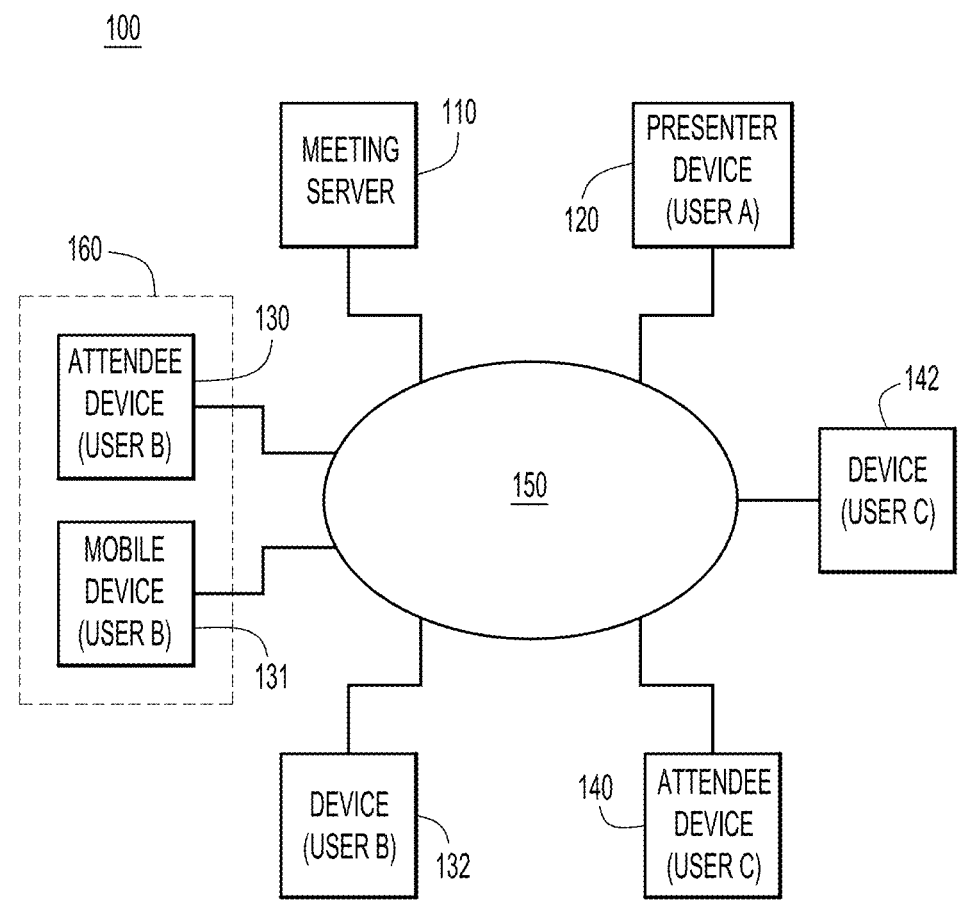
FIG. 1 is a block diagram of a system of devices configured to participate in an online conference session according to an example embodiment.

Referring to FIG. 1, an online conference system 100 is shown that enables a meeting server 110 to facilitate an online conference session (e.g., a web meeting) in which users can share voice, video, chat, and/or other types of data communication through devices 120, 130, 132, 140, and/or 142 over network 150. The online conference session may further comprise desktop sharing and/or application sharing. A user associated with the devices 130 and 132 may have a mobile device 131 that is capable of joining a conference session, but also capable of participating in communication activity outside of an online conference, e.g., a mobile smartphone or tablet computer device. Thus, for example, device 130 and mobile device 131 are associated with the same user account for a user. In other words, the user can use the same user account credentials on either attendee device 130 or mobile device 131 in order to participate in an online conference session. In the example shown in FIG. 1, user A is associated with presenter device 120, user B is associated with attendee device 130, mobile device 131, and device 132, and user C is associated with attendee device 140 and device 142. Only three users associated with various numbers of devices are shown in FIG. 1, but any number of users may be included in system 100, and each user may be associated with any number of devices. Any of the devices 120, 130, 131, 132, 140, and 142 are capable of joining the online conference session, but for clarity, hereinafter, devices used to participate in the online meeting will be referred to as attendee devices or presenter devices. In general, presenter device 120 and devices 130, 132, 140, and 142 may take a variety of forms, including a desktop computer, laptop computer, mobile/cellular phone (e.g., Smartphone), tablet computer, Internet telephone, etc. Network 150 may be any type of network (e.g., any combination of Internet, intranet, local area network (LAN), wide area network (WAN), wired network, wireless network, etc.) that connects computing devices, e.g., presenter device 120 and attendee devices 130, 132, 140, and 142. Meeting server 110 may be used, for example, to mediate transactions between presenter device 120 and attendee devices 130, 132, 140, and 142. Server 110 may also perform caching or other time/bandwidth saving techniques. It should be understood that in a web-based conference system, each device may communicate with the server 110 through a browser application having one or more plug-ins that enable the web-based meeting experience, and allow for the transmission of data to the meeting server 110, and the reception of data from the meeting server during a conference/meeting session.

In accordance with the embodiments presented herein, the meeting server 110 is configured to control behavior of a user's additional device, e.g., a mobile device, when the user is participating in an online conference session from another physical device. Communications activity of the user's mobile device could become a disruption in the online conference session if it is within a predetermined proximity to the attendee device from which the user is participating in a conference session. This is depicted in FIG. 1 in which User B and attendee device 130 and mobile device 131 are associated with a user account, for online meeting (and perhaps other) purposes, of User B. The predetermined proximity is generally depicted at reference numeral 160.

Figure 2:
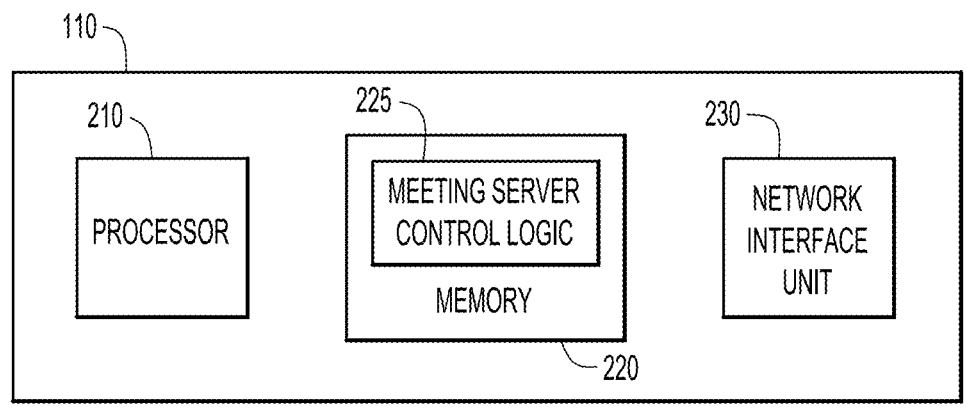
FIG. 2 is a block diagram of a meeting server configured to facilitate the online conference session according to an example embodiment.

Referring now to FIG. 2, a simplified block diagram of meeting server 110 is shown. Server 110 includes a processor 210 to process instructions relevant to an online conference session supported by the system 100, memory 220 to store a variety of data and software instructions (e.g., audio, video, control data, etc.), including meeting server control logic/software 225. The server also includes a network interface unit (e.g., card) 230 that enables network communications so that the server 110 can communicate with other devices, e.g., the presenter and attendee devices, as well as other devices associated with a user account, as explained in further detail hereinafter. Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software (e.g., the meeting server control logic/software 225) comprising computer executable instructions and when the software is executed (by the processor 210) it is operable to perform the operations described herein.

Figure 3:
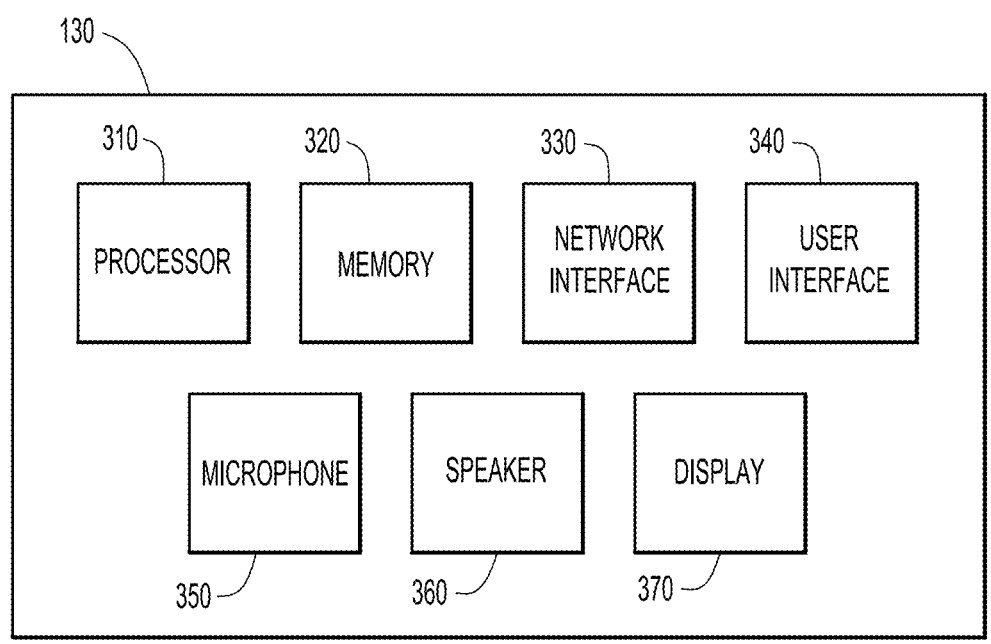
FIG. 3 is a block diagram of a user device configured to join the online conference session according to an example embodiment.

Referring now to FIG. 3, a simplified block diagram of an example device, e.g., presenter device or attendee device is shown. For simplicity, FIG. 3 shows a block diagram of one of the attendee devices, generically referred or labeled with reference numeral 130. The device includes a processor 310 to process instructions relevant to a conference/meeting session supported by the system 100, memory 320 to store a variety of data and software instructions (e.g., display data for shared documents, applications, as well software instructions for a browser application to enable the connectivity and display of data during a conference session, etc.). The device also includes a network interface unit (e.g., card) 330 to communicate with other devices over network 140. Device 130 may further include a user interface unit 340 to receive input from a user, microphone 350 and speaker 360. The user interface unit 340 may be in the form of a keyboard, mouse and/or a touchscreen user interface to allow for a user of the attendee device to interface with the device. Microphone 350 and speaker 360 enable audio to be recorded and output, respectively, and may comprise an array of a plurality of microphones and/or speakers. Device 130 may also comprise a display 370 that can display data to a user, such as content associated with a conference session.

Memory 320 may comprise read only memory (ROM), random access memory (RAM), magnetic disk storage media devices, optical storage media devices, flash memory devices, electrical, optical, or other physical/tangible (e.g., non-transitory) memory storage devices. The processor 310 is, for example, a microprocessor or microcontroller that executes instructions for implementing the processes described herein. Thus, in general, the memory 320 may comprise one or more tangible (non-transitory) computer readable storage media (e.g., a memory device) encoded with software comprising computer executable instructions and when the software is executed (by the processor 310) it is operable to perform the operations described herein.

Figure 4:
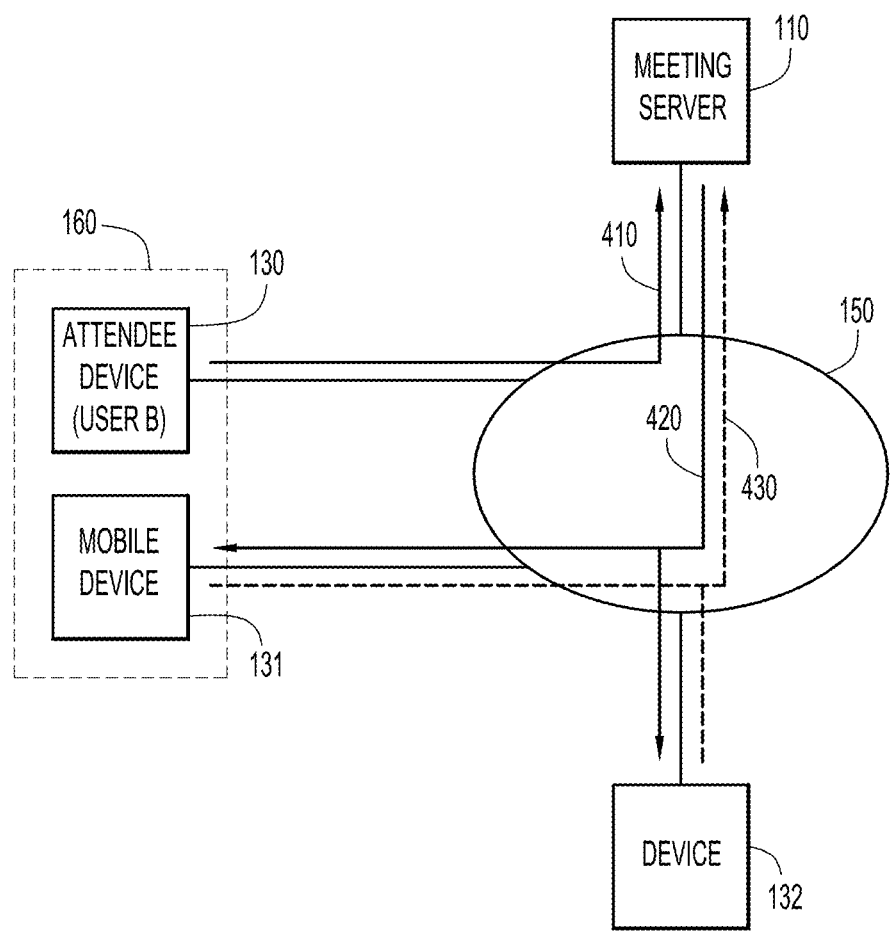
FIG. 4 is a diagram of an example embodiment showing the meeting server determining which of a plurality of devices associated with a user account are in proximity to each other, according to an example embodiment.

Referring now to FIG. 4, an example of determining which of a plurality of user devices are in proximity to each other is shown. Attendee device 130 sends to meeting server 110 a message 410 comprising a request to join an online meeting facilitated by the meeting server 110. This request 410 may be generated in response to a user selected a link of a meeting invitation maintained on a calendar of a user. Request 410 may further comprise location data for attendee device 130 so that meeting server 110 may determine the location of device 130.

Meeting server 110 sends message 420 requesting location data from other devices, and in particular from any other devices associated with a user account of a person that is participating in the conference session. Thus, in the example begun in FIG. 1 and also shown in FIG. 4, user B is using attendee device 130 to participate in the conference session, and is also associated with a mobile device 131 and a device 132. Mobile device 131 and device 132 are configured with any necessary software that enables the meeting server 110 to communicate with mobile device 131 and device 132 on behalf of user B. By way of this software, the meeting server 110 will send the message 420 to the mobile device 131 and device 132 (i.e., the devices associated with user B) to request the location of the mobile device 131 and device 132. Mobile device 131 and device 132 respond with message 430 comprising location data for its respective device. Using the location data from attendee device 130, mobile device 131, and device 132, in the depicted example, the meeting server 110 can determine whether mobile device 131 and/or device 132 is within a predetermined distance/proximity 160 of attendee device 130. In the example shown in FIGS. 1 and 4, mobile device 131 is within proximity 160 of attendee device 130, but device 132 is not within proximity 160 of attendee device 130.

In one example, the location data comprises Global Positioning System (GPS) coordinates or other satellite positioning system data. In another example, the location data may be derived from near field communication (NFC) data, Bluetooth data, or data from nearby wireless networks (e.g., Wi-Fi positioning). In some examples, meeting server requests location data from some or all of the devices associated with any single user account for users who are participating in a conference session, e.g., for User B. In another example, the meeting server periodically requests and stores location data from any device that is capable of communicating with the meeting server. Alternatively, the meeting server may only request location data from devices that are associated with a user account after that user account registers with the online meeting.

Figure 5:
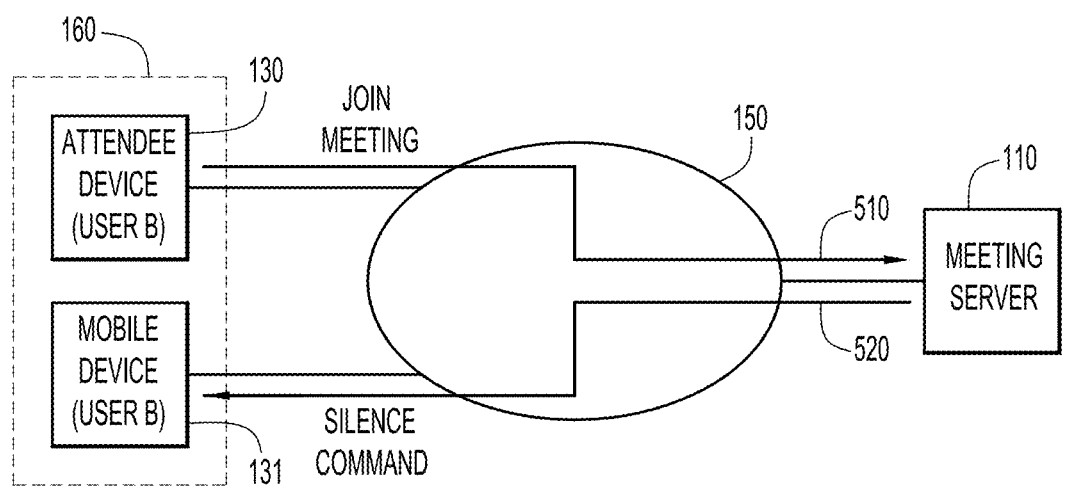
FIG. 5 is a diagram of an example embodiment showing a user device joining the online conference session, according to an example embodiment.

Referring now to FIG. 5, a simplified diagram shows an example of the messages passed between devices and the meeting server when an attendee device joins an online meeting with another device nearby. Attendee device 130 joins an online meeting with message 510, and meeting server determines that mobile device 131 is within a predetermined distance/proximity 160 to attendee device 130, as described above with respect to FIG. 4. Meeting server sends a message 520 to mobile device 131 instructing device 132 to go into a "silent" mode, i.e., mute itself. For example, the message 520 received from the meeting server causes the mobile device 131 to turn off its ringer and any other notification sounds. Muting/silencing mobile device 131 while the user is engaged in the online meeting via attendee device 130 allows the meeting server 110 to prevent the distracting sound of mobile device 131 ringing or generating other alerts (e.g., from received emails, incoming phone calls, text messages, video call invitations, etc.) if the user should receive an incoming communication request while engaged in the online meeting.

If the meeting server 110 determines that the mobile device 131 is not within a predetermined proximity to the attendee device 130, then the meeting server 110 will not send the message 520 containing the silence/mute command.

Similarly, when attendee device 130 leaves the online meeting, the meeting server 110 will detect the user's status change (no longer in an online meeting) and will send to mobile device 131 a message that causes the mobile device 131 to return to normal alert operation, thereby turning off the mute/silence operation of the mobile device 131.

Figure 6:
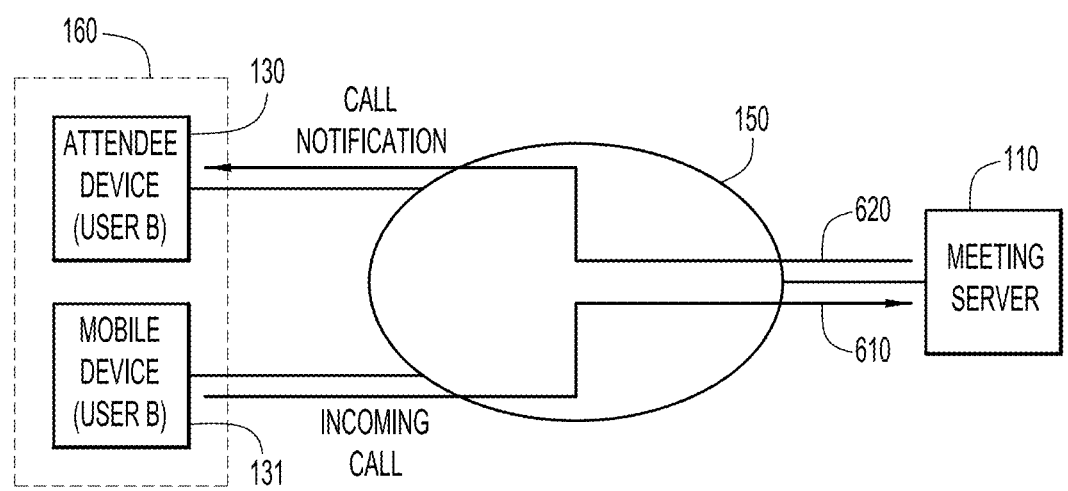
FIG. 6 is a diagram of an example embodiment showing a user device receiving a phone call during the online conference session, according to an example embodiment.

Referring now to FIG. 6, a simplified diagram shows an example of the messages passed between devices and the meeting server when mobile device 131 receives an incoming communication notification outside of the online meeting. When mobile device 131 receives an outside communication notification (e.g., receives a phone call), it sends message 610 to meeting server 110 notifying the meeting server 110 of the incoming communication notification. In response, the meeting server 110 sends message 620 to attendee device 130 notifying the user that mobile device 131 has an incoming communication notification. In one example, message 620 is part of the online meeting session, and the notification to the user appears on attendee device 130 as part of the meeting. An example of an alert displayed to the user of attendee device 130 (without it being shared into the online meeting) is shown in FIG. 7A.

In one example, the incoming communication notification may be the automatic number identification (ANI) of an incoming phone call. In another example, the incoming communication notification may be a short message service (SMS) message, a multimedia messaging service (MMS) message, an email message, a video call invitation, etc. It is envisioned that any type of incoming communication notification at mobile device 131 may trigger the message notification to the meeting server. However, it is to be understood that this is user configurable and a user may wish to be notified about incoming voice calls, video calls and text messages (as opposed to email messages) when participating in an online meeting from attendee device 130. Messages 610 and 620 may comprise information about the incoming communication notification (e.g., the phone number of the caller or sender), such that user B may receive some information on whether to acknowledge the incoming communication notification and potentially start a communication session outside of the online meeting. The information about the incoming message may be augmented by an address book stored on one or more of the attendee device 130, mobile device 131, or meeting server 110.

Figure 7A:
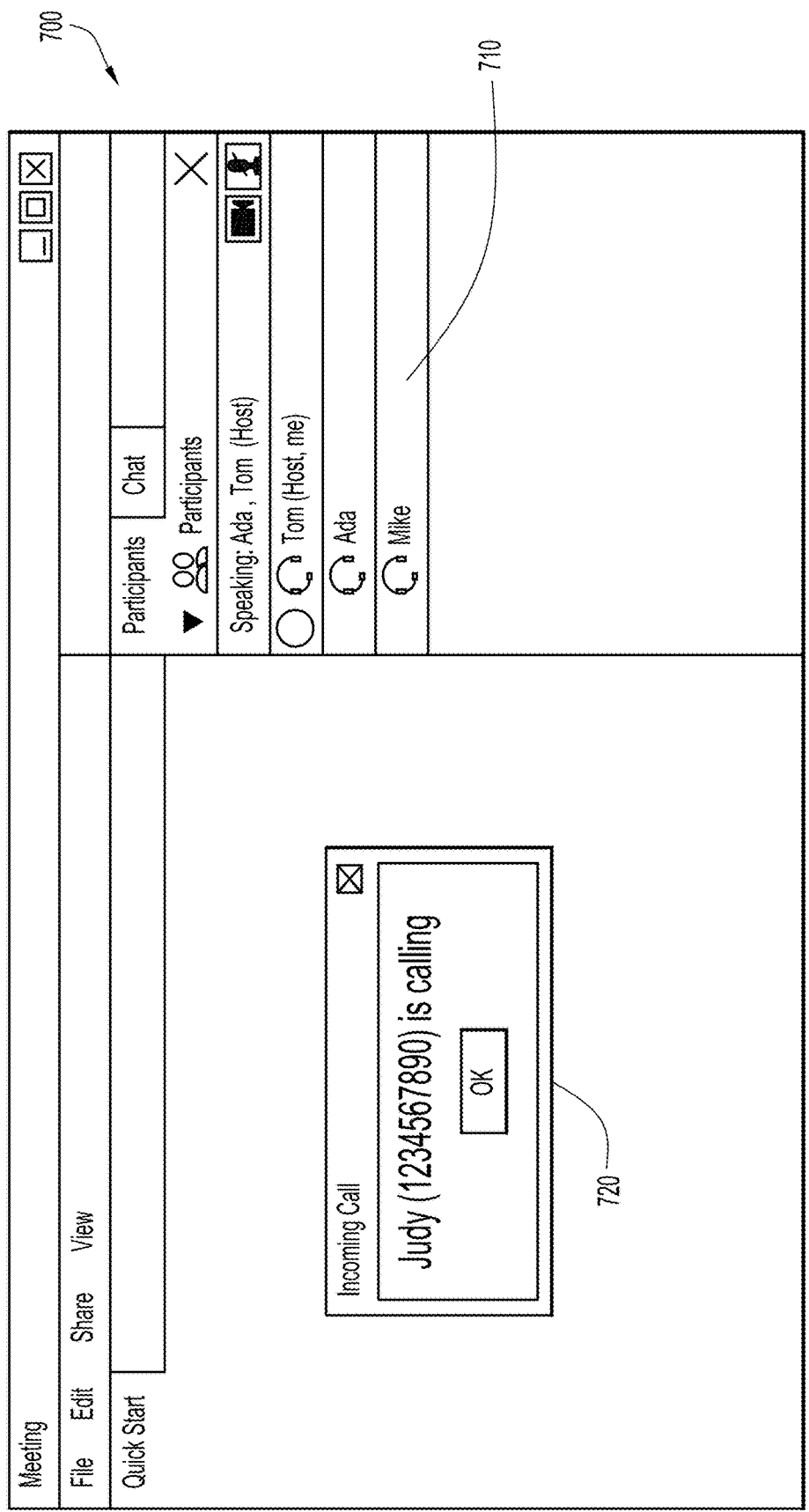
FIGS. 7A and 7B are simulated screenshots of the notification that a user device participating in the online conference session receives while a nearby user device receives a phone call, according to an example embodiment.

Referring now to FIG. 7A, an example screenshot 700 of the display of an attendee device, in an online meeting, that receives a notification from a nearby attendee device is shown. Screen 700 shows an example of the content displayed to a user while engaged in an online meeting session. In one example, meeting list 710 displays the participants in the online meeting session, as well as information about the participants' status (e.g., presenter or attendee, whether each participant is muted, the device each participant is using to contribute audio to the meeting, etc.). A dialog box 720 is displayed that notifies the user of an incoming communication notification, e.g., a phone call in this example, on mobile device 131, which has been silenced for the online meeting. In one example, the phone number and name of the person calling is displayed in dialog box 720. The screenshot 700 is an example of a notification presented to a user when the user is not sharing any content from attendee device 130.

Figure 7B:
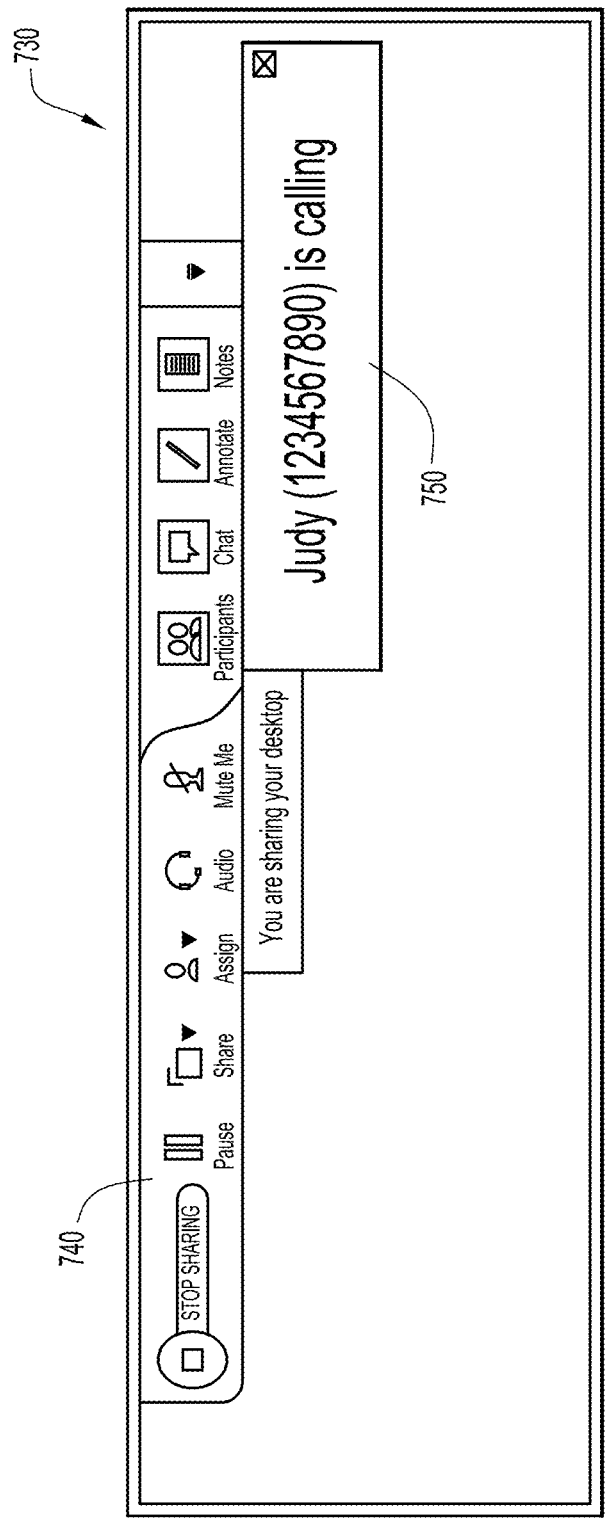

Referring now to FIG. 7B, a partial screenshot from the display of attendee device 130 that is sharing content during an online meeting, e.g., sharing a desktop or application. Screen 730 shows a portion of the desktop of attendee device 130 that is currently being shared with other participants in the online meeting. In one example, menu bar 740 is displayed along the top of screen 730 to allow a user to control aspects of the desktop sharing session. Attendee device 130 displays pop-up notification 750 bringing the attention of the user to an incoming communication notification, e.g., a phone call, on mobile device 131, which has been silenced for the online meeting. In one example, the phone number and name of the person calling is displayed in pop-up notification 750. Notification 750 is not shared as part of the desktop sharing session to maintain the privacy of the user and the incoming caller.

Figure 8A:
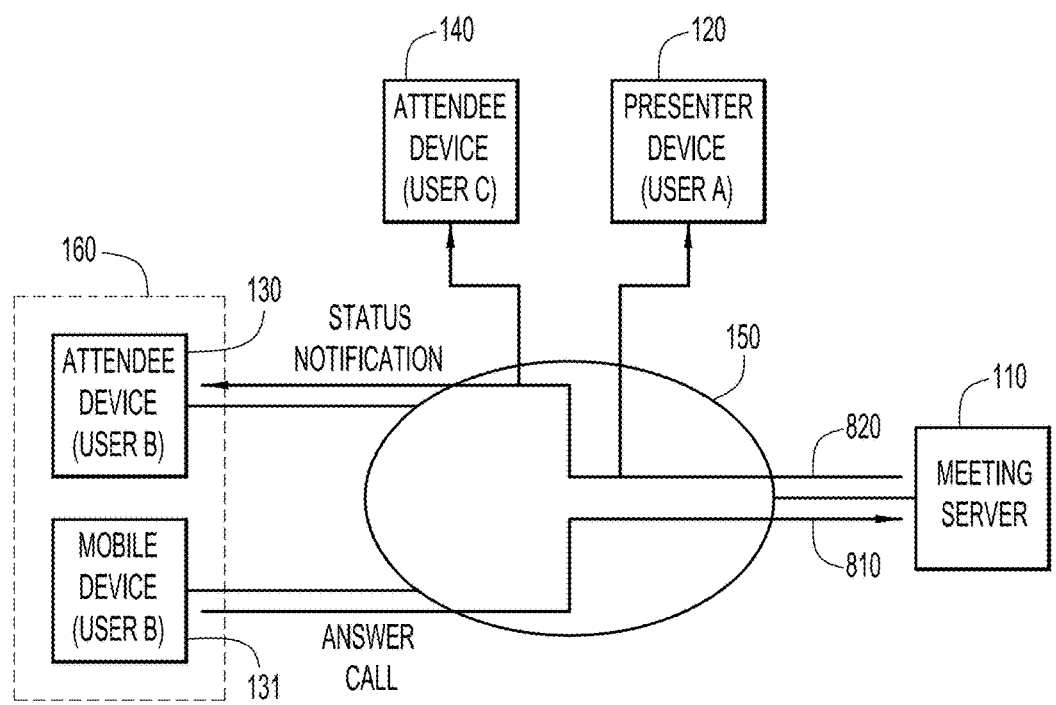
FIG. 8A is a diagram of a user device answering a phone call while the user is participating in an online conference session according to an example embodiment.

Referring now to FIG. 8A, a simplified diagram is provided that shows an example of the messages passed between the devices and the meeting server 110 when a user engages in an outside communication during the online meeting. For example, when user B answers an incoming phone call on mobile device 131, mobile device 131 sends a message 810 to the meeting server 110 to inform the meeting server 110 that the user in engaging in an outside communication during the online meeting. In response to message 810, the meeting server 110 transmits message 820 to all of the participants in the meeting session. In one example, the meeting server 110 sends message 820 to attendee device 130, which belongs to the user engaged in the outside communication, as well as to attendee device 140, which is associated with user C, and presenter device 120, which is associated with user A. Message 820 notifies each of the participants in the online meeting that user B (who is also participating in the online meeting) is engaged in an outside communication, and that user B may be distracted from the online meeting. This enhances the user experience for all of the participants in the online meeting by providing contextual information to explain a user's lack of response to questions that may be directed to the user in the online meeting.

In one example, the meeting server 110 may mute/disable the audio associated with the online meeting that would be sent to attendee device 130 to prevent any confidential information associated with the online meeting from being heard by a party participating in the uncontrolled outside communication session. Additionally, the meeting server 110 may prevent any audio detected at attendee device 130 from being transmitted to other participants of the online meeting, thereby preventing any information from the outside communication session from being transmitted throughout the online meeting. Alternatively, meeting server 110 may disregard at least any audio data received from attendee device 130 while the user in engaged in the outside communication session using mobile device 131.

Figure 8B:
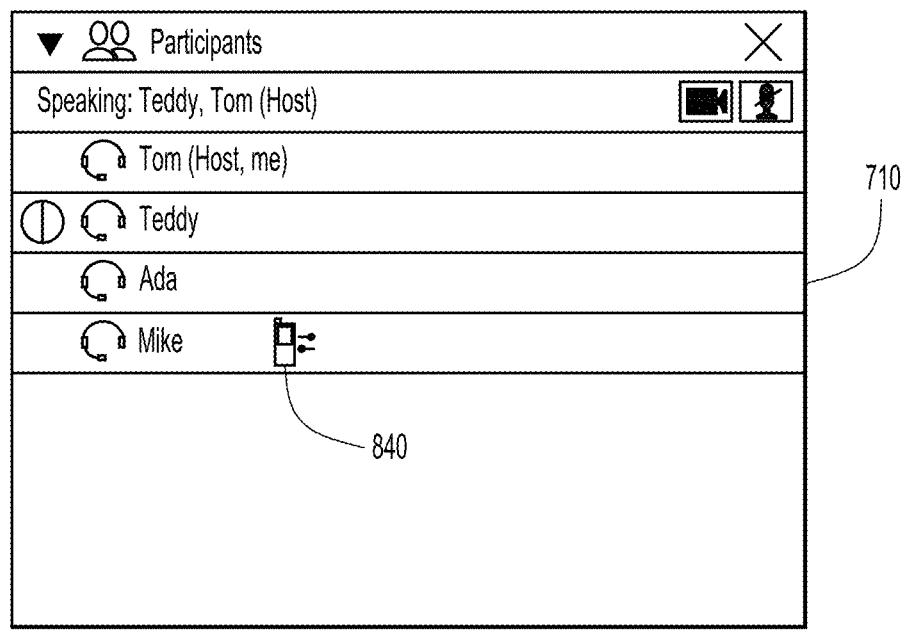
FIG. 8B is a simulated screenshot of a list of participants including a participant who is engaged in an outside phone call during the online conference session, according to an example embodiment.

Referring now to FIG. 8B, a partial screenshot of the display on an attendee device is shown. This figure shows the participant list of an online meeting in which one participant is engaged in an outside communication session. Participant list 710 shows a listing of all of the participants in the online meeting. Notification icon 840 indicates that user Mike is engaged in an outside communication session, such as a phone call. This notification allows the other participants of the online meeting to be aware of another user's state of attention in the online meeting.

Figure 9:
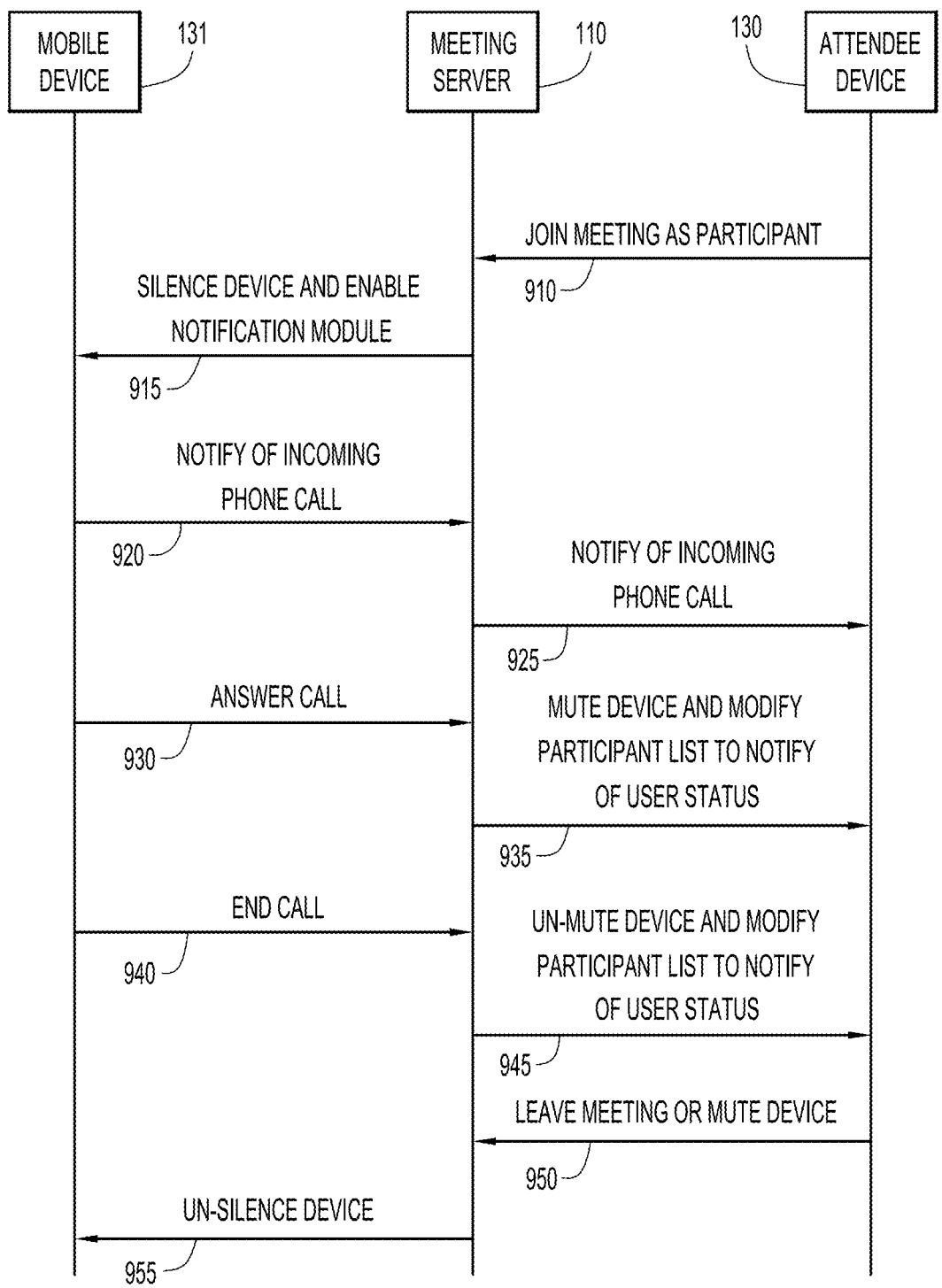
FIG. 9 is a timing flow diagram of various messages passed between nearby devices according to an example embodiment.

Referring now to FIG. 9, a ladder diagram shows an example of the interaction between an attendee device and a nearby mobile device associated with the same user, and the meeting server. In this example, a user joins an online meeting through attendee device 130 (e.g., a computer) by sending message 910 (e.g., in response to clicking on a link in a meeting invitation maintained in a user's calendar) to meeting server 110. After meeting server 110 determines that mobile device 131 (e.g., a mobile phone) is physically proximate (e.g., within a predetermined number of feet, in the same building, on the same floor of a building, etc.) the attendee device 130, meeting server 110 sends message 915 to the mobile device 131. Message 915 includes a command configured to silence/mute mobile device 131, and enables a notification function in the mobile device 131 that will notify the meeting server 110 when the mobile device 131 receives an incoming communication notification (outside of the online meeting), such as an incoming phone call.

In one example, if mobile device 131 receives an outside phone call, it sends message 920 to the meeting server 110 notifying the meeting server 110 of the incoming phone call. Meeting server 110 passes the notification to the user via message 925 to the attendee device 130. If the user chooses to answer the outside phone call, the mobile device 131 sends message 930 to meeting server 110 notifying the meeting server 110 that the user in engaged in an outside phone call. Meeting server 110 sends message 935 or otherwise causes any inbound audio to the attendee device 130 from the online meeting and/or any outbound audio from the attendee device 130 to the meeting server, to be muted/disabled. The meeting server 110 may also modify the list of participants in the online meeting to thereby notify all of the participants of the user's status (e.g., as depicted in FIG. 8B). The list of participants may be updated on all of the participants' devices, enabling the entire online meeting to be aware that the user of attendee device 130 (and mobile device 131) is on an outside phone call. When the user ends the outside phone call, mobile device 131 sends message 940 to the meeting server 110 notifying the meeting server 110 that the outside call has ended. In response, the meeting server 110 sends message 945 to attendee device 130 or otherwise enables any inbound and/or outbound audio and allows the user to participate in the online meeting again from the attendee device 130. Message 945 may also modify the list of participants, indicating that the user is no longer on the outside phone call.

After the user leaves the online meeting, the attendee device 130 sends message 950 to the meeting server 110, which sends message 955 to mobile device 131 causing the mobile device to be unsilenced/return to normal mode. In another example, if the user mutes attendee device 130 such that no audio is being contributed to the online meeting, the attendee device 130 may send, to meeting server 110, a message 950 that indicates that the meeting server 110 may un-silence mobile device 131.

Figure 10:
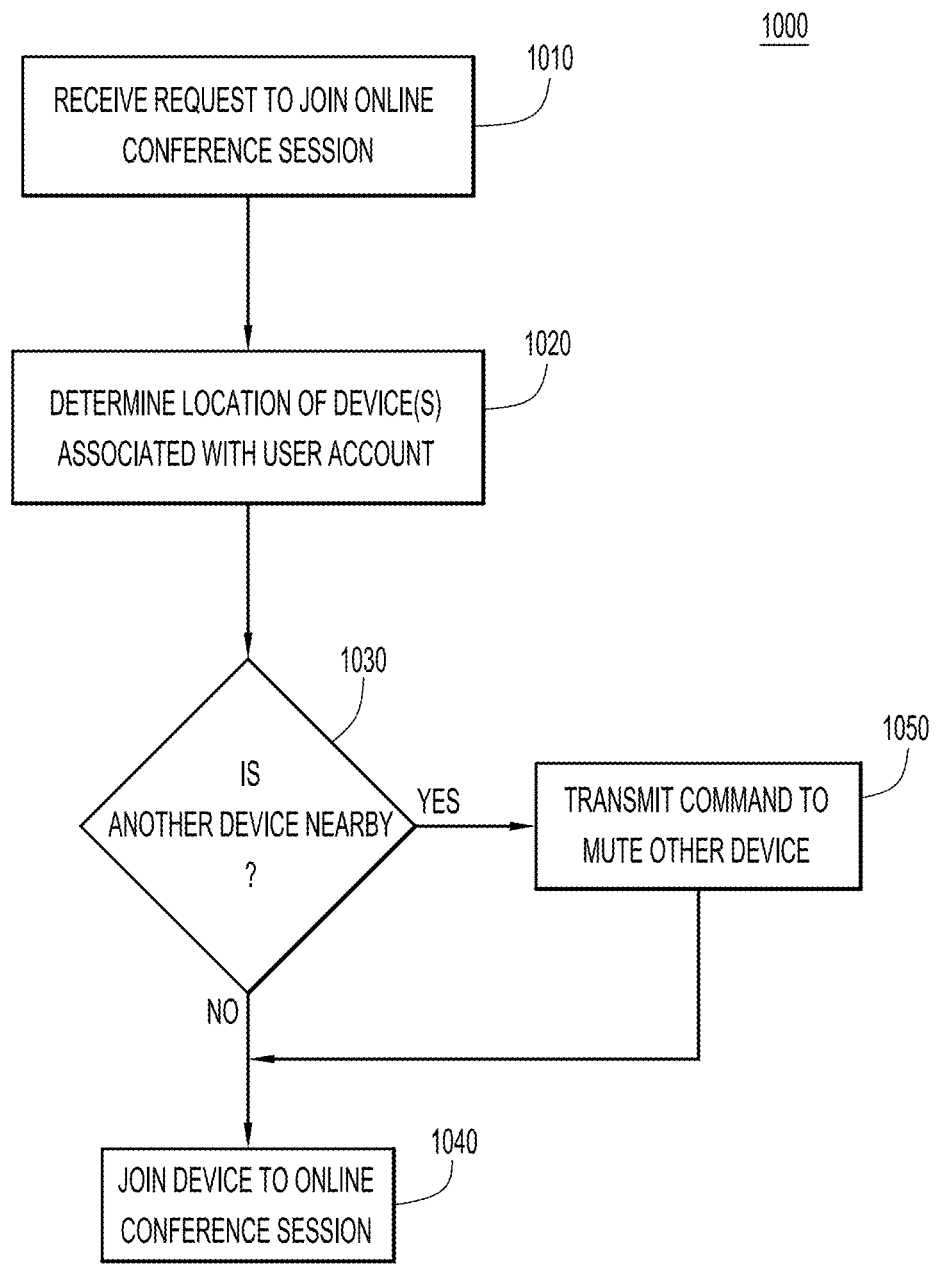
FIG. 10 is a process flow diagram for a meeting server binding two nearby devices according to an example embodiment.

Referring now to FIG. 10, a flowchart is shown for an example process 1000 for a meeting server to join a device to an online conference session. In step 1010, the meeting server receives a request from a first device to join an online conference session. The meeting server determines the location of at least one other device associated with the same user account at step 1020. If the other device is not within a predetermined distance of the first device, as determined at step 1030, or if there are no other devices associated with the user account, then the meeting server joins the first device to the online conference session at step 1040. If the other device is within a predetermined distance of the first device, then the meeting server transmits a command to the other device that silences the other device at step 1050.

Figure 11:
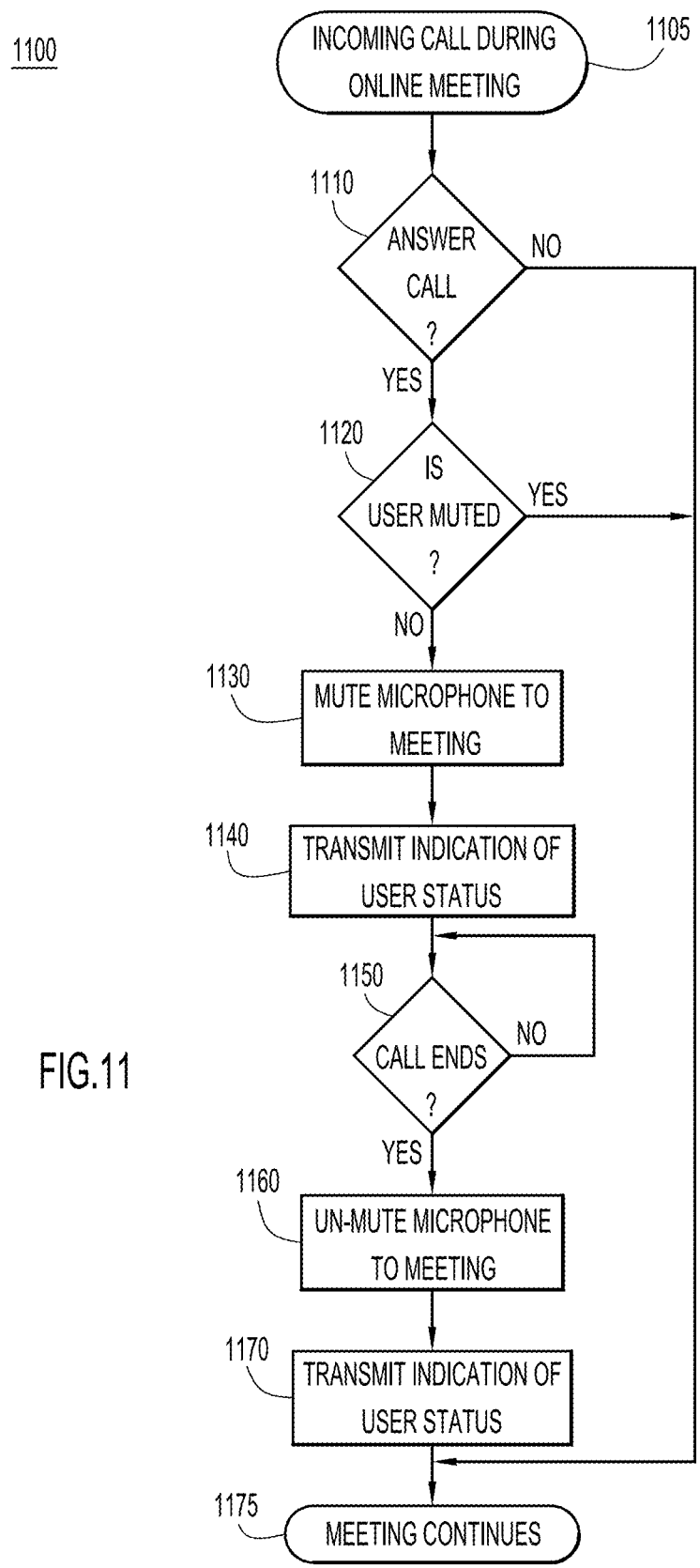
FIG. 11 is a process flow diagram for receiving a call during an online conference session according to an example embodiment.

Referring now to FIG. 11, a flowchart shows an example process 1100 for a handling an outside communication (e.g., a call) during an online meeting. Initially, at step 1105, an online meeting is in progress, and a participant in the meeting receives a phone call on a mobile device. If the user decides to answer the call, as determined at step 1110, and the user is not muted in the meeting, as determined at 1120, then the user's microphone that provides audio to the meeting is muted at step 1130. In step 1140, the user's mobile device transmits an indication of the user's status on an outside call. The indication of the user's status may be forwarded to some or all of the other participants in the online meeting. Once the call ends, as determined in step 1150, the user's microphone that provides audio to the meeting is un-muted at step 1160, and the user can again participate in the meeting. In step 1170, the user's status is updated to indicate that the user is no longer engaged on the outside phone call, and the meeting continues at step 1175. If the user either decides to ignore the outside phone call, or if the user is already muted from the meeting, as determined in steps 1120 and 1130 respectively, then the meeting continues at step 1175, and no further steps are necessary. In one example, the audio of the meeting is also muted while the user is on the outside phone call to prevent the audio of the meeting from being heard in the outside phone call. Once the outside phone call ends, the audio of the meeting may be restored.

In summary, the techniques presented herein provide for seamlessly bonding all of a user's devices to the state of an online meeting. In this manner, even devices that are not actively connected into the meeting do not interrupt the online meeting, but the user still receives notifications from all of the user's devices. Any user devices that are close enough to interrupt an online meeting session are silenced for the meeting, and any notifications from nearby devices may be routed to a user through the online meeting. The user is still free to answer notifications from nearby devices without disrupting the meeting, since the meeting is muted for the user when the user answers a nearby device. While the user is using the nearby device, the other participants are notified that the user may be distracted from the meeting.

In one example, the techniques presented herein provide for a computer-implemented method comprising receiving a request to join an online conference session from a first device at a first location. The first device is associated with a user account. The method further comprises determining at least one second location corresponding to at least one second device also associated with the user account. Responsive to a determination that the second location is within a predetermined distance of the first location, the method comprises transmitting a command to mute the second device.

In another example, the techniques presented herein provide for joining an online conference session with a first device using a user account. The first device receives a first notification within the online conference session that a second device associated with the user account has received an incoming communication request outside of the online conference session. The first device displays the notification as part of the online conference session.

In a further example, the techniques presented herein provide for a first device associated with a user account receiving a first command from a meeting server to enter a silent mode. The meeting server facilitates an online conference session among a plurality of devices other than the first device including a second device associated with the user account. In this example, the first device is within a predetermined distance of the second device. The first device receives a request for communication outside the online conference session, and transmits a notification of the request for communication outside the online conference session to the meeting server.

In another example, the techniques presented herein provide for an apparatus comprising a network interface configured to communicate data across a computer network and a processor. The processor is configured to receive a request to join an online conference session through the network interface from a first device. The first device is at a first location and associated with a user account. The processor is further configured to determine at least one second location corresponding to at least one second device also associated with the user account. Responsive to a determination that the second location is within a predetermined distance of the first location, the processor is configured to generate a command to transmit via the network interface to mute the second device. The command is configured to cause the second device to enter a silent mode. The processor is then configured to join the first device to the online conference session.

In a further example, the techniques presented herein provide for a method comprising facilitating an online conference session between a plurality of participant devices. The plurality of participant devices includes a first device associated with a user account. The method further comprises determining that a second device associated the user account is within a predetermined distance of the first device. The method then comprises receiving a notification that the second device has received a message from outside the online conference session. A notification message is transmitted to the first device comprising at least a portion of the message from outside the online conference session.

In yet another example, the techniques presented herein provide for a system comprising a plurality of devices associated with a user account and a meeting server. The meeting server is configured to receive a request to join an online conference session from a first device of the plurality of devices. The first device is at a first location. The meeting server is further configured to determine at least one second location corresponding to at least one second device of the plurality of devices associated with the user account. Responsive to a determination that the second location is within a predetermined distance of the first location, the meeting server is configured to transmit a command to mute the second device. The meeting server is then configured to join the first device to the online conference session.

In a further example, the techniques presented herein provide for an apparatus comprising a network interface configured to communicate data over a computer network and a processor. The processor is configured to associate the apparatus with a user account and receive, via the network interface, a location request from a meeting server facilitating an online conference session between a plurality of devices other than the apparatus. The processor is further configured to transmit an indication of a location of the apparatus, and receive, via the network interface, a command to mute the apparatus in response to a determination that the location of the apparatus is within a predetermined distance of one of the plurality of devices participating in the online conference session. The processor is configured to mute the apparatus to prevent any audio from the apparatus from the apparatus from being captured by any of the plurality of devices participating in the conference session.

The above description is intended by way of example only. Various modifications and structural changes may be made therein without departing from the scope of the concepts described herein and within the scope and range of equivalents of the claims.

What is claimed is:
1. A computer-implemented method comprising:
receiving a request to join an online conference session from a first device at a first location, the first device associated with a user account;
determining at least one second location corresponding to at least one second device, the at least one second device associated with the user account but not participating in the online conference session; and
responsive to a determination that the second location is within a predetermined distance of the first location, transmitting a command to cause the second device to enter a silent mode.

2. The method of claim 1, wherein the request to join the online conference session further comprises an indication of the first location.

3. The method of claim 1, wherein determining the at least one second location comprises transmitting a location request to the at least one second device, the location request soliciting a response from the at least one second device with an indication of the second location.

4. The method of claim 1, wherein the first location and the second location are represented by GPS coordinates.

5. The method of claim 1, further comprising:
receiving a notification that the second device has received an incoming communication request that is outside the online conference session; and
transmitting to the first device a notification message pertaining to the incoming communication request for presentation during the online conference session.

6. The method of claim 5, further comprising:
receiving an indication that the second device is engaging in an outside communication session;

disabling audio from the online conference from being transmitted to the first device; and preventing any audio detected at the first device from being communicated into the online conference session.

7. The method of claim 6, further comprising displaying an icon in a window associated with the online conference session to participants of the online conference session, the icon indicating that a user associated with the user account is participating in the outside communication session.

8. The method of claim 5, wherein the incoming communication request comprises one of Automatic Number Identification (ANI) associated with a telephone call, a short message service (SMS) message, a multimedia messaging service (MMS) message, or an email.

9. A computer-implemented method comprising:
joining an online conference session with a first device using a user account;
receiving a first notification within the online conference session that a second device associated with the user account has received an incoming communication request outside of the online conference session, wherein the second device is not participating in the online conference but is located within a predetermined distance of the first device that is participating in the online conference session; and
displaying the notification on the first device as part of the online conference session.

10. The method of claim 9, further comprising:
receiving a second notification that the second device is engaged in an outside communication;
displaying, in association with a participant list of the online conference session, a graphical element indicating that the second device is engaged in the outside communication; and
silencing the first device, such that audio from the online conference session is prevented from being transmitted into the outside communication.

11. The method of claim 10, further comprising:
receiving a third notification that the second device has ended the outside communication removing the graphical element in association with the display of the participant list; and
enabling an audio output of the first device such that audio from the online conference session is audible at the first device.

12. The method of claim 9, further comprising:
receiving a second notification that the second device is engaged in an outside communication;
displaying, in association with a participant list of the online conference session, a graphical element indicating that the second device is engaged in the outside communication; and
disabling an audio input for the first device such that audio from the outside communication is prevented from being transmitted to the online conference session.

13. The method of claim 12, further comprising:
receiving a third notification that the second device has ended the outside communication;
removing the graphical element in association with the display of the participant list; and
enabling the audio input for the first device, such that first device sends audio to the online conference session.

14. The method of claim 9, wherein joining the online conference session comprises transmitting a first location of the first device.

15. The method of claim 9, wherein displaying the first notification on the first device comprises identifying a sender of the incoming communication request.

16. A computer-implemented method comprising:
receiving, at a first device associated with a user account, a first command from a meeting server to enter a silent mode, the meeting server facilitating an online conference session among a plurality of devices other than the first device, wherein the plurality of devices participating in the online conference session includes a second device associated with the user account, and wherein the first device is within a predetermined distance of the second device;
receiving, at the first device, a request for communication outside the online conference session; and
transmitting to the meeting server a notification of the request for communication outside the online conference session.

17. The method of claim 16, further comprising:
receiving a first user input to respond to the request for communication outside the online conference session; and
transmitting to the meeting server a first indication that the first device is engaged in the outside communication.

18. The method of claim 17, further comprising:
receiving a second user input to end the outside communication; and
transmitting to the meeting server a second indication that the first device has ended the outside communication.

19. The method of claim 16, further comprising:
receiving, from the meeting server, a second command to exit the silent mode and enter a normal mode; and
enabling an audio output on the first device in response to the second command.

20. The method of claim 16, wherein transmitting the notification of the request for communication outside the online conference session comprises identifying a sender of the request, and transmitting the identity of the sender of the request to the meeting server.

21. An apparatus comprising:
a network interface unit configured to communicate over a network with a plurality of devices;
a processor configured to:
receive, via the network interface unit, a request to join an online conference session from a first device at a first location, the first device associated with a user account;
determine at least one second location corresponding to at least one second device, the at least one second device associated with the user account but not participating in the online conference session; and
responsive to a determination that the second location is within a predetermined distance of the first location, cause a command to be transmitted via the network interface unit, the command configured to cause the second device to enter a silent mode.

22. The apparatus of claim 21, wherein the processor is configured to determine the at least one second location by causing a location request to be transmitted via the network interface unit to the at least one second device, the location request soliciting a response from the at least one second device with an indication of the second location.

23. The apparatus of claim 21, wherein the processor is further configured to:

receive, via the network interface unit, a notification that the second device has received an incoming communication request that is outside the online conference session; and causing the network interface unit to transmit to the first device a notification message pertaining to the incoming communication request for presentation during the online conference session.

24. The apparatus of claim 23, wherein the processor is further configured to:

receive, via the network interface unit, an indication that the second device is engaging in an outside communication session;

disable audio from the online conference from being transmitted to the first device; and prevent any audio detected at the first device from being communicated into the online conference session.

* * * * *